United States Patent
Hug

(10) Patent No.: US 11,415,982 B2
(45) Date of Patent: Aug. 16, 2022

(54) METHOD FOR THE REMOTE CONTROL OF A MOTOR VEHICLE BY MEANS OF A MOBILE CONTROLLER, AND REMOTE CONTROL SYSTEM

(71) Applicant: DAIMLER AG, Stuttgart (DE)

(72) Inventor: Tobias Hug, Magstadt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 404 days.

(21) Appl. No.: 16/332,528

(22) PCT Filed: Aug. 30, 2017

(86) PCT No.: PCT/EP2017/001030
§ 371 (c)(1),
(2) Date: Mar. 12, 2019

(87) PCT Pub. No.: WO2018/050269
PCT Pub. Date: Mar. 22, 2018

(65) Prior Publication Data
US 2019/0212729 A1    Jul. 11, 2019

(30) Foreign Application Priority Data
Sep. 14, 2016  (DE) ............... 10 2016 011 071.6

(51) Int. Cl.
*G05D 1/00* (2006.01)
*G08C 17/00* (2006.01)
*G06V 20/10* (2022.01)

(52) U.S. Cl.
CPC ......... *G05D 1/0033* (2013.01); *G05D 1/0016* (2013.01); *G05D 1/0022* (2013.01);
(Continued)

(58) Field of Classification Search
CPC .. G05D 1/0033; G05D 1/0016; G05D 1/0022; G05D 2201/0213; G05D 1/0011;
(Continued)

(56) References Cited

U.S. PATENT DOCUMENTS 10,002,525 B2    6/2018  Scheerle et al.
2012/0065814 A1* 3/2012  Seok ............... G06F 3/04886
                                                    382/104
(Continued)

FOREIGN PATENT DOCUMENTS

CN    101470440 A    7/2009
CN    203902480 U    10/2014
(Continued)

OTHER PUBLICATIONS

Autonomous Driving: Range Rover Sport Remote Control, Jul. 3, 2015, Land Rover (Year: 2015).*
(Continued)

*Primary Examiner* — Elaine Gort
*Assistant Examiner* — Matthias S Weisfeld
(74) *Attorney, Agent, or Firm* — Patent Portfolio Builders PLLC

(57) ABSTRACT

A method for the remote control of at least one function of a motor vehicle by means of a mobile controller involves a remote control command transmitted to the motor vehicle and executed by the motor vehicle if an approval has been issued. The method provides a remote control system that has a particularly high level of reliability, which is achieved by detecting an image of the motor vehicle by an optical detection device in the mobile controller is transmitted to the motor vehicle, and the approval is then issued by a checking device in the motor vehicle if the motor vehicle has been identified in the transmitted image by the checking device.

17 Claims, 1 Drawing Sheet

(52) U.S. Cl.
CPC .............. *G06V 20/10* (2022.01); *G08C 17/00* (2013.01); *B60K 2370/55* (2019.05); *G05D 2201/0213* (2013.01); *G08C 2201/93* (2013.01)

(58) Field of Classification Search
CPC ...... G05D 1/00; G06K 9/00664; G08C 17/00; G08C 2201/93; B60K 2370/55
USPC ............................................................. 701/2
See application file for complete search history.

(56) References Cited

U.S. PATENT DOCUMENTS

| | | | | |
|---|---|---|---|---|
| 2015/0202962 A1* | 7/2015 | Habashima | ............ | B60K 37/06 345/633 |
| 2015/0223064 A1* | 8/2015 | Takemura | ............. | H04W 12/06 455/411 |
| 2015/0367861 A1* | 12/2015 | Mori | ..................... | B60W 50/14 701/1 |
| 2016/0224025 A1 | 8/2016 | Petel | | |
| 2017/0180330 A1* | 6/2017 | Su | ......................... | G08C 17/00 |

FOREIGN PATENT DOCUMENTS

| | | | | |
|---|---|---|---|---|
| CN | 105339991 A | | 2/2016 | |
| DE | 102013010819 A1 | | 12/2014 | |
| EP | 2617627 A2 | * | 7/2013 | ................ B60T 7/16 |
| JP | 2006069534 A | | 3/2006 | |
| KR | 20120140544 A | | 12/2012 | |

OTHER PUBLICATIONS

Office Action dated Jun. 2, 2020 in related/corresponding CN Application No. 201780056300.3 (references from OA not cited herewith have previously been made of record).
International Search Report dated Dec. 6, 2017 in related/corresponding International Application No. PCT/EP2017/001030.
Written Opinion dated Dec. 6, 2017 in related/corresponding International Application No. PCT/EP2017/001030.

* cited by examiner

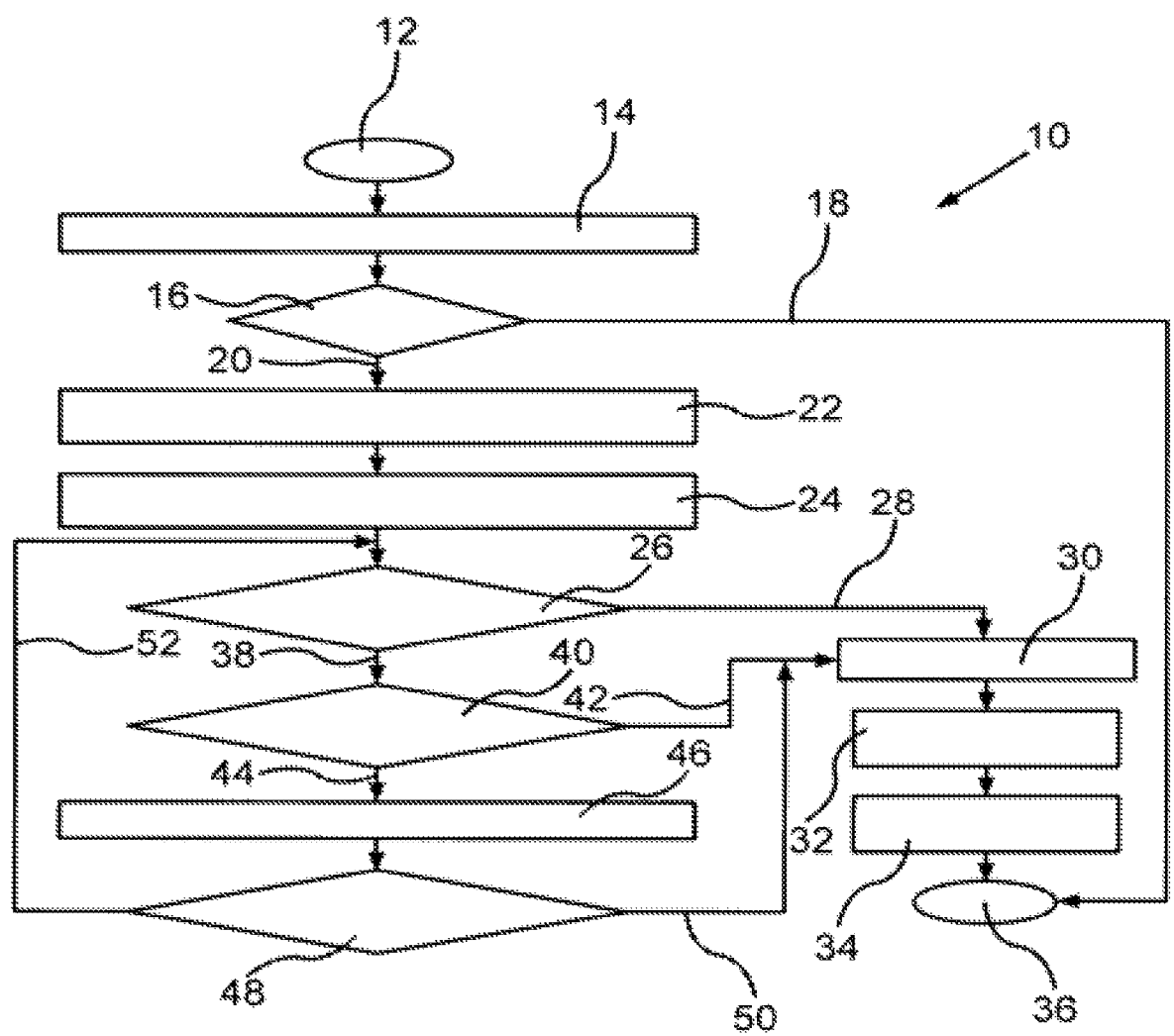

METHOD FOR THE REMOTE CONTROL OF A MOTOR VEHICLE BY MEANS OF A MOBILE CONTROLLER, AND REMOTE CONTROL SYSTEM

BACKGROUND AND SUMMARY OF THE INVENTION

Exemplary embodiments of the invention relate to a method for the remote control of at least one function of a motor vehicle by means of a mobile controller and furthermore to a remote-control system.

DE 10 2013 010 819 A1 discloses a method and an apparatus for the remote control of a function of a vehicle. In the method, an optical or acoustic signal generated in the vehicle is detected by means of a signal reception unit integrated in a mobile controller. The remote control is approved only if the signal is actually detected. Additionally, a permission signal can also be transmitted from the mobile control unit to the vehicle, with the remote control being approved only if the permission signal is detected by the vehicle and recognized as valid. Furthermore, images of the vehicle can be detected by a camera of the control unit and are output by an optical display unit integrated in the control unit.

Exemplary embodiments of the present invention are directed to a method for the remote control of a motor vehicle and a remote-control system comprising a remote-controllable motor vehicle and a mobile controller which ensure particularly secure remote control.

In a method according to the invention for the remote control of at least one function of a motor vehicle by means of a mobile controller, a remote-control command is sent to the motor vehicle by means of the mobile controller and is executed by the motor vehicle if an approval has been granted. In order to ensure particularly secure remote control, according to the invention, an image of the motor vehicle detected by means of an optical detection device of the mobile controller is transmitted to the motor vehicle and the approval is granted by a test device of the motor vehicle if the motor vehicle has been identified in the image by the test device.

In order to send or transmit the remote-control command and the image, a data connection is established between the mobile controller and the motor vehicle. This can be, for example, a radio connection or any other, preferably wireless, connection. For example, in this case, the mobile controller or the motor vehicle can act as a WLAN hotspot or an ad hoc network can be established. The mobile controller and the motor vehicle have corresponding sending and receiving devices for this purpose. The mobile controller can be a dedicated electronic appliance, i.e., a remote control; however, it is also conceivable to use a mobile terminal such as a cellphone (smartphone) or a portable computer (tablet) as the mobile controller.

The test device of the motor vehicle can comprise an electronic circuit, a computer, and/or a software component that is connected to the receiving device of the motor vehicle and that can automatically carry out image processing and/or image analysis in order to identify the motor vehicle in the image. The approval can be, for example, a control instruction or a signal that is transmitted to a control device of the motor vehicle and designed to carry out or execute the remote-control command.

The method according to the invention advantageously allows a simple, convenient and secure monitoring of the remote control because, to detect or capture the image, the mobile controller can be very easily directed toward the motor vehicle by the relevant operator and it is thereby simultaneously ensured that the motor vehicle is also located in the field of vision of the operator. As a result, every remote-control command is advantageously always carried out or executed under the supervision or observation of the operator. In addition, an execution of a remote-control command granted accidentally or inadvertently is therefore advantageously ruled out to a sufficiently safe degree.

Remote-controllable functions of the motor vehicle can be manifold and may comprise, for example, actuating electronic or electric, or electrically operated, devices of the motor vehicle. However, in particular, a movement, maneuver or driving maneuver of the motor vehicle may be prompted and/or monitored or controlled in a remote-controlled manner. As a result, for example, the motor vehicle may be moved or maneuvered into a parking space or position that offers so little free space that it is not possible to conveniently enter or exit the vehicle. Advantageously, the motor vehicle can additionally be moved more conveniently and safely since, on account of the position of the operator outside the motor vehicle, the operator has a better overview of the situation and, if necessary, can adjust or change their position and thus also their perspective in a simpler and more comprehensive way than is possible for the vehicle occupant.

In a further embodiment of the method according to the invention, a video of the motor vehicle is recorded by means of the optical detection device of the mobile controller and is transmitted to the motor vehicle. The approval is continuously granted in order to carry out or execute the remote-control command as long as the motor vehicle is continuously identified in the video by the test device. In other words, not only an individual image of the motor vehicle is detected and transmitted, but a video signal or a video stream. A video in this case may also be an image sequence or a sequence of individual images. This advantageously allows a continuous and real-time monitoring or verification of whether the motor vehicle is located in the field of vision of the mobile controller and thus implicitly also in the field of vision of the operator during the remote-control process. Furthermore, it is particularly advantageous that it is possible to react quickly, in particular in real time, when the motor vehicle is no longer located in the detection region of the mobile controller, or of the optical detection device of the mobile controller. In order to identify the motor vehicle, object recognition and/or object tracking algorithms may be used.

If the motor vehicle cannot or can no longer be identified in the image or video transmitted by the mobile controller, the execution of the remote-control command, or the execution or continuation of for example a prepared or begun driving maneuver, is interrupted or canceled. In this case, a corresponding cancellation message may also be delivered to the operator. For example, a cancellation message of this kind may be transmitted by the motor vehicle to the mobile controller and displayed on the controller on a display surface. Additionally, or alternatively, however, acoustic signaling of the cancellation is also conceivable, for example.

In a further embodiment of the method according to the invention, a plausibility test of the remote-control command is carried out by the test device and the approval is granted only if the remote-control command has been evaluated as plausible. This advantageously results in an additional increase in the safety of the remote-control process. By means of the plausibility test or plausibility check, obvious or easily recognizable discrepancies, inaccuracies, errors, problems and/or risks of the remote-control command or execution of the remote-control command can be sensed or ascertained. For this purpose, information on a state, situation, position, and/or surroundings of the motor vehicle, which information can be provided for example by relevant sensors or assistance systems, may also be taken into account or processed.

An example of an implausible remote-control command would be, for example, one that would obviously lead to a collision with an object or obstacle sensed or detected in the surroundings of the motor vehicle. A plausibility test or plausibility check may be executed or implemented in hardware and also in software. Signals or commands that are only permitted to occur in certain combinations or sequences may be monitored, for example. Values, variables, or corresponding ranges and the temporal profile thereof may also be checked. For example, a remote-control command can be evaluated as implausible if the execution thereof would lead to a specific variable, for example a speed of the motor vehicle, assuming a value outside of a legally permitted range, for which purpose, for example, a current position of the motor vehicle, for example within a defined locality, can be analyzed and taken into account. Remote-control commands that could, in a particular situation or in a particular state of the motor vehicle, lead to the motor vehicle becoming damaged, can also be evaluated as implausible. An example of this could be a command to start moving backward while the motor vehicle is moving forward at at least a predefined minimum speed. Generally, a plurality of rules can be defined and specified by the manufacturer for the plausibility check. The plausibility test can in this case also comprise, or be, a validity check.

In another embodiment of the method according to the invention, if a communication problem between the mobile controller and the motor vehicle is sensed, the execution of the remote-control command is canceled by the motor vehicle and the motor vehicle is shifted into a state in which the vehicle is secured against unintended movements. In such a case, a vehicle securing process would thus automatically be initiated by the motor vehicle, as a result of which unintended and/or unsupervised movements or functions due to the communication problem, for example, can be prevented from being carried out or executed. As a result, damage to the motor vehicle or to other objects, or even a negative impact on a surrounding traffic situation, can also be avoid or minimized, as appropriate. Communication problems that lead to cancellation of the execution of the command may be, for example, a latency of the data connection between the mobile controller and the motor vehicle above a predefined limit or, for example, a data rate that is too low, or an interruption to the data connection.

In a further embodiment of the method according to the invention, the image detected by the optical detection device of the mobile controller or a corresponding video of the motor vehicle is represented by means of a display device of the mobile controller. It is displayed in the representation whether the motor vehicle has been successfully identified by the test device. For example, a successful identification may be displayed or visualized by a colored, for example green, frame around the motor vehicle and an erroneous or incomplete identification or sensing may be displayed or visualized by a differently colored, for example red, frame around the motor vehicle. Alternatively, or additionally, of course, any other markings, indications or the like may also be conceivable. For example, augmented reality techniques or measures may also be used. Advantageously, by virtue of the representation and display to the operator, feedback that can be recognized particularly simply and intuitively, as well as quickly and securely, regarding a particular sensing or identification status is provided, thus allowing or facilitating a reliable and targeted remote control of the motor vehicle.

In a further embodiment of the method according to the invention, a plausibility test of the remote-control command is carried out by the mobile controller, a result of the plausibility test sent to the motor vehicle and the approval granted if the remote-control command has been evaluated as plausible by the mobile controller. The plausibility test can be carried out by the mobile controller in addition or as an alternative to a plausibility test being carried out by the motor vehicle and offers the same or corresponding advantages.

A remote-control system according to the invention comprises a motor vehicle and mobile controller that can communicate with each other via a data connection. In order to ensure a particularly secure remote control of the motor vehicle by means of the mobile controller, according to the invention, the remote-control system is designed to carry out the method according to the invention.

The functional embodiments of the method according to the invention described above and below and, in the claims, as well as the corresponding advantages, can accordingly be transferred analogously to the remote-control system according to the invention and to devices and components used to carry out the method, and vice versa.

Further advantages, features and details of the invention can be found in the following description of a preferred embodiment and with reference to the drawings.

BRIEF DESCRIPTION OF THE DRAWING FIGURE

FIG. 1 is a schematic representation of a flowchart of an embodiment of the method according to the invention.

DETAILED DESCRIPTION

FIG. 1 schematically shows a flowchart 10 of a method for the remote control of at least one function of a motor vehicle by means of a mobile controller. At a start 12 of the method, the mobile controller, and the motor vehicle or at least one receiving device of the motor vehicle for receiving signals sent by the mobile controller, is activated or switched on. This can, for example, also include starting a software application on the mobile controller. A connection setup 14 between the mobile controller and the motor vehicle then takes place, as a result of which a connection is thus established or intended to be established allowing communication and data transmission between the mobile controller and the motor vehicle. This, preferably wireless, connection is tested and/or evaluated by a connection test 16. It can thereby be checked, for example, whether it has been possible to successfully establish the connection, whether a latency of the connection is below a specified limit value, and/or whether a signal strength and/or a possible or achievable data transmission rate of the connection is above a particular specified limit value.

If the connection test 16 produces a negative result, i.e., the connection does not meet the necessary or specified requirements for communication and data transmission or has not been able to establish a connection, the method follows a path 18 which leads to an end 36 of the method. The method in this case is thus ended until, for example, a new attempt to establish a connection takes place. If the connection test 16 delivers a positive result, i.e., the connection meets the required or specified requirements, the method follows a path 20.

Subsequently, an action, maneuver, or remote-control command is selected or input on the mobile controller by an operator. Preferably, this selection or input is explicitly confirmed by the operator. A transmission 22 of a remote-control command representing or encoding the selection or input then takes place from the mobile controller to the motor vehicle via the data connection. Simultaneously or subsequently, the motor vehicle is detected by means of an optical detection device, for example a camera, of the mobile controller. A video or video signal representing or detecting the motor vehicle, preferably in real time, can be recorded or generated in the process. The video can preferably also be represented or displayed to the operator on a display screen or by means of a display device of the mobile controller. Sending 24 the video or the video signal from the mobile controller to the motor vehicle preferably also takes place in real time.

A validity test 26 of the data and/or signals sent from the mobile controller via the data connection and received by the receiving device of the motor vehicle is then carried out in or by the motor vehicle. If the validity test 26 produces a negative result, i.e., the received data measured or evaluated in terms of specified properties or conditions to be met prove to be completely or partly invalid, the method follows a path 28, which leads to a maneuver cancellation 30. A cancellation message of this kind is transmitted by the motor vehicle to the mobile controller and a display 32 of the cancellation message is output on the controller. Disconnection 34 subsequently takes place whereupon the end of the method is also reached in the process.

However, if the validity test 26 produces a positive result, the method follows a path 38 and a sensing or identification of the motor vehicle in the received video or video signal is carried out or attempted. A plausibility test 40 of the remote-control command also takes place at this point. If the motor vehicle is not sensed and/or the remote-control command is evaluated as implausible, the method follows a path 42 which likewise leads to the maneuver cancellation 30 and, via the steps described above, to the end 36 of the method. If the vehicle is sensed, however, and the remote-control command is evaluated as plausible, an approval grant 46 subsequently takes place and the remote-control command is executed by the motor vehicle.

The validity test 26, a query as to whether the vehicle has been sensed, the plausibility test 40, and the approval grant 46 can be carried out by an electronic test device of the motor vehicle. Likewise, individual parts or processes can however also be carried out or undertaken by other appliances or components of the motor vehicle.

During the execution of the remote-control command, a reception query 48 takes place continuously, by means of which a reception of additional data or signals, in particular of the video signal, is checked and detected. If no additional data are received, successful sensing of the motor vehicle obviously cannot take place either, such that a path 50 is followed to the maneuver cancellation 30. If additional data are received, however, the method resumes following a path 52 and using the validity test 26 of the newly received data. Provided that the motor vehicle continues to be detected by the camera of the mobile controller and all validity tests 26 and all plausibility tests 40 are successful or produce positive results, a request of the operator is granted and the remote control or the execution of the remote-control command or even of additional remote-control commands continues.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for remotely controlling at least one function of a motor vehicle by a mobile controller, the method comprising:
   receiving, by the motor vehicle from the mobile controller, a remote-control command for a movement, maneuver, or driving maneuver of the motor vehicle;
   receiving, by the motor vehicle from the mobile controller, a captured image of an exterior of the motor vehicle;
   determining, by the motor vehicle, whether the exterior of the motor vehicle appears in the captured image;
   determining, by the motor vehicle, whether or not the remote-control command is plausible depending upon whether or not the movement, maneuver, or driving maneuver of the motor vehicle would result in a collision with an object or obstacle surrounding the motor vehicle;
   approving execution of the remote-control command if it is determined that the exterior of the vehicle appears in the captured image and the movement, maneuver, or driving maneuver of the motor vehicle being plausible;
   executing, by the motor vehicle, the remote-control command responsive to the approval.

2. The method of claim 1, wherein
   the captured image is part of a video of the motor vehicle, and
   the approval is continuously granted and the remote-control command is executed so long as the motor vehicle is continuously identified in the video by the motor vehicle.

3. The method of claim 1, wherein
   the captured image is part of a video of the motor vehicle, and
   the movement, maneuver, or driving maneuver of the motor vehicle is interrupted or canceled when the motor vehicle is no longer identified in the video.

4. A remote-control system, comprising:
   a motor vehicle; and
   a mobile controller,
   wherein the mobile controller is configured to
      send a remote-control command to the motor vehicle,
      capture an image of the motor vehicle, and
      transmit the captured image of the motor vehicle to the motor vehicle, and wherein the motor vehicle is configured to
  determine whether the motor vehicle appears in the captured image,
  approve execution of the remote-control command responsive to the determination that the motor vehicle appears in the captured image, and
  execute the remote-control command responsive to the approval,
wherein the mobile controller is configured to display the captured image and an indication of whether or not the vehicle has been determined to appear in the captured image.

5. The remote-control system of claim 4, wherein the captured image of the motor vehicle includes an exterior of the motor vehicle.

6. The remote-control system of claim 5, wherein the remote control command is for a movement, maneuver, or driving maneuver of the motor vehicle.

7. The remote-control system of claim 6, wherein
  the captured image is part of a video of the motor vehicle that is recorded by an optical detection device of the mobile controller,
  the video is transmitted to the motor vehicle, and
  the movement, maneuver, or driving maneuver of the motor vehicle is interrupted or canceled when the motor vehicle is no longer identified in the video.

8. The remote-control system of claim 4, wherein the motor vehicle is configured to conduct a plausibility test of the remote-control command, wherein the approval is granted only if the remote-control command has been evaluated as plausible, wherein the remote-control command is evaluated as plausible if the movement, maneuver, or driving maneuver of the motor vehicle would not result in a collision with an object or obstacle surrounding the motor vehicle.

9. A method for remotely controlling at least one function of a motor vehicle by a mobile controller, the method comprising:
  sending, by the mobile controller to the motor vehicle, a remote-control command;
  capturing, by the mobile controller, an image of the motor vehicle;
  transmitting, by the mobile controller to the motor vehicle, the captured image of the motor vehicle;
  determining, by the motor vehicle, whether the motor vehicle appears in the captured image;
  approving execution of the remote-control command responsive to the determination that the motor vehicle appears in the captured image; and
  executing, by the motor vehicle, the remote-control command responsive to the approval,
wherein the captured image is displayed on the mobile controller and the mobile controller displays whether or not the vehicle has been determined to appear in the captured image.

10. The method of claim 9, wherein
  the captured image is part of a video of the motor vehicle that is recorded by an optical detection device of the mobile controller,
  the video is transmitted to the motor vehicle, and
  the approval is continuously granted so long as the motor vehicle is continuously identified in the video by the motor vehicle.

11. The method of claim 9, wherein, responsive to detection of a communication problem between the mobile controller and the motor vehicle, the execution of the remote-control command is canceled by the motor vehicle and the motor vehicle is shifted into a state in which the motor vehicle is secured against unintended movements.

12. The method of claim 9, further comprising:
  conducting, by the motor vehicle, a plausibility test of the remote-control command, wherein the approval is granted only if the remote-control command has been evaluated as plausible.

13. The method of claim 12, further comprising:
  conducting, by the mobile controller, a plausibility test of the remote-control command; and
  sending, by the mobile controller to the vehicle, a result of said plausibility test, wherein the approval granted if the remote-control command has been evaluated as plausible by the mobile controller.

14. The method of claim 9, wherein the captured image of the motor vehicle includes an exterior of the motor vehicle.

15. The method of claim 14, wherein the remote control command is for a movement, maneuver, or driving maneuver of the motor vehicle.

16. The method of claim 15, wherein
  the captured image is part of a video of the motor vehicle that is recorded by an optical detection device of the mobile controller,
  the video is transmitted to the motor vehicle, and
  the movement, maneuver, or driving maneuver of the motor vehicle is interrupted or canceled when the motor vehicle is no longer identified in the video.

17. The method of claim 15, further comprising:
  conducting, by the motor vehicle, a plausibility test of the remote-control command, wherein the approval is granted only if the remote-control command has been evaluated as plausible, wherein the remote-control command is evaluated as plausible if the movement, maneuver, or driving maneuver of the motor vehicle would not lead to a collision with an object or obstacle surrounding the motor vehicle.

* * * * *